Patented Jan. 25, 1949

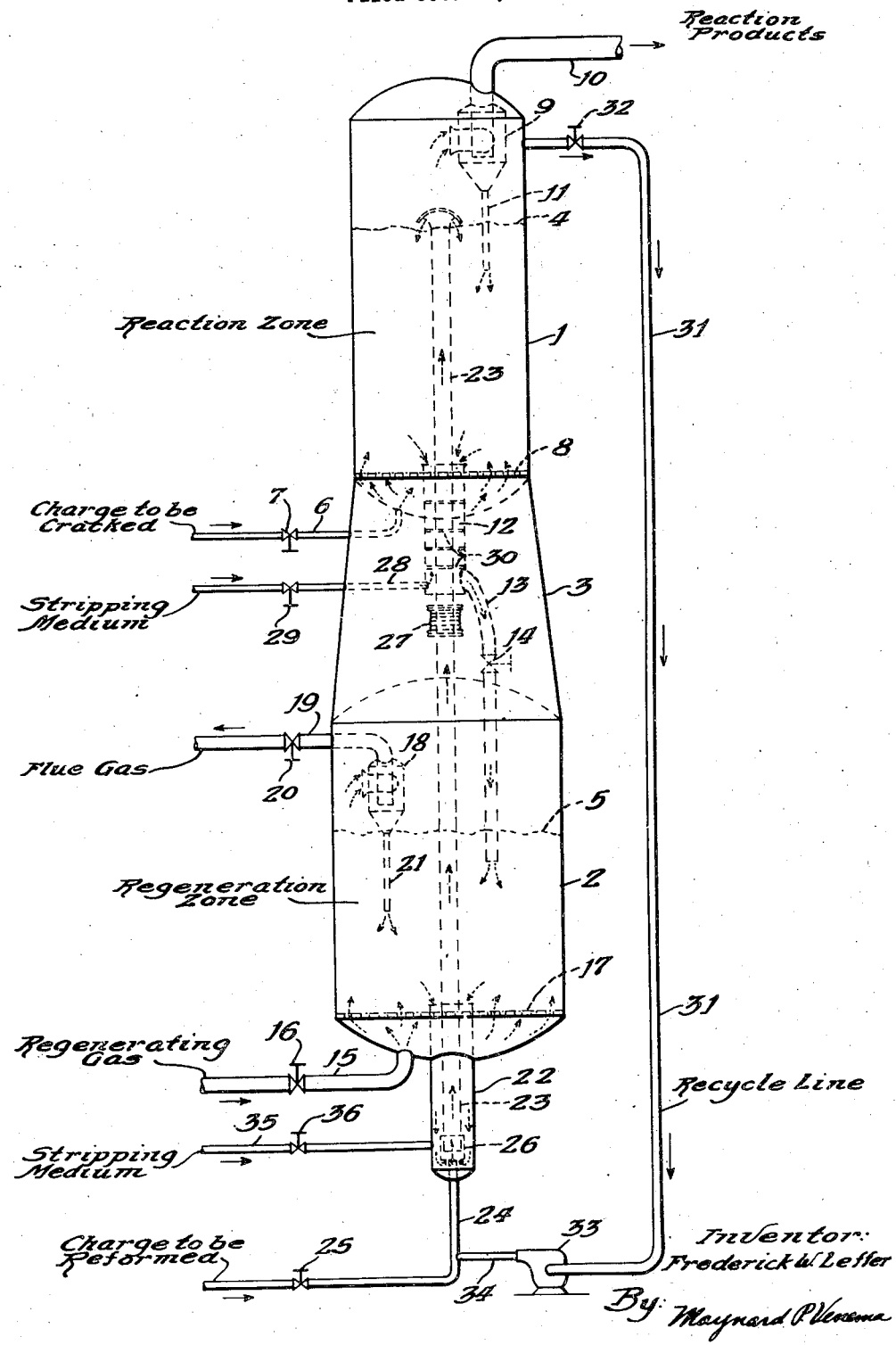

2,459,824

UNITED STATES PATENT OFFICE 2,459,824

METHOD AND APPARATUS FOR CONTACTING SUBDIVIDED SOLID CONTACT MATERIAL WITH FLUID REACTANTS, PARTICULARLY HYDROCARBONS

Frederick W. Leffer, Riverside, Ill., assignor to Universal Oil Products Company, Chicago, Ill., a corporation of Delaware Application October 31, 1946, Serial No. 706,914

10 Claims. (Cl. 196—52)

This invention relates to an improved method and compact apparatus for contacting subdivided solid contact material successively with several different fluid reactants, particularly hydrocarbons to be converted with the aid of a catalyst amenable to regeneration. More specifically, the invention is directed to an improved catalytic treatment of hydrocarbons comprising the simultaneous cracking of a relatively heavy hydrocarbon oil, reforming of a lighter hydrocarbon oil and recirculation of a product stream within a compact unitary apparatus.

It is an object of this invention to provide a method for contacting two different fluid reactants, such as for example, two different hydrocarbon streams, in a single contact unit with separate portions of a moving mass of subdivided solid contact material while a third portion of said mass is being contacted with a regenerating fluid so that two conversion operations and a regeneration operation may be simultaneously effected in a more compact apparatus than has hitherto been available for similar operations.

Another object of the invention, is to provide an improved flow and apparatus arrangement whereby counter-current flow of solid particles and reactant streams is obtained in both the reaction and the regeneration zones.

A further object of the invention is to provide for the withdrawal of finely divided solid particles from the reaction zones in a manner permitting improved stripping of the particles prior to their passage to a subsequent contacting zone.

Other objects and advantages of the improved flow method and the arrangement of apparatus of this invention will be pointed out in the subsequent description. The principles and general conditions of the fluidized catalytic conversion operations to which the present invention may be applied are now well known to the chemical and petroleum arts and need not be described in detail herein.

In a broad aspect the method of contacting particles of a subdivided solid contact material successively with three different fluid streams according to the present invention comprises maintaining a downwardly moving bed of said particles in each of two confined contacting zones disposed in vertical alignment, continuously discharging solid particles from the upper of said zones to the top of the bed in said lower zone, passing one of said fluid streams upwardly through the bed in said lower zone, withdrawing solid particles from the lower portion of said lower zone and commingling them with a vertically upwardly flowing second fluid stream, passing the resultant mixture upwardly in a confined straight line path through the lower contacting zone and the bed therein and through substantially the height of the bed in said upper zone, discharging the solid particles of said mixture from the top of said straight line vertical path to the top of the bed in said upper zone, and passing a third fluid stream upwardly through the bed in said upper zone.

In a specific embodiment, the improved operation of this invention comprises maintaining a downwardly moving bed of subdivided solid particles in each of two confined zones disposed in vertical alignment one with the other, passing a first fluid stream upwardly through the bed in the lower of said zones at sufficiently velocity to maintain this bed in turbulent fluidized state, continuously discharging solid particles from the upper of said zones to the top of the bed in the lower zone, withdrawing solid particles downwardly in an annular column from the lower portion of said lower zone, reversing the direction of flow of the particles withdrawn from the lower zone by commingling them with a vertically upwardly flowing second fluid stream, passing the resultant suspension of solid particles in said second fluid stream upwardly in a confined straight line path through the lower zone and the bed therein and substantially through the height of the bed in the upper zone and discharging the same to the top of the bed in said upper zone, and passing a third fluid stream upwardly through the bed in said upper zone at sufficient velocity to maintain the bed therein in turbulent fluidized state.

In a particular operation of the method defined above a product stream removed from the upper portion of the upper contact zone or a portion of the products discharged from the upper portion of said upper zone is recycled to the lower end of the unit whereby this stream or portion is employed to cause solid particles withdrawn from the bottom portion of the lower zone to be transferred upwardly through the confined straight line path to the top of the bed in the upper contacting zone. The recycled stream may thus take the place of the second fluid stream to effect the necessary transfer of particles from the lower contacting zone to the upper. This recycle operation is advantageous in starting up the unit. Moreover, in applying this recycle operation, it will sometimes be found desirable to mix the recycle stream with a second fluid medium from an external source to provide a combined or mixed fluid stream for transferring the catalyst particles upwardly to the top of the bed in the upper contacting zone and for simultaneously therewith effecting the conversion of at least one of the components of such mixed fluid stream.

The arrangement of the contact chambers, transfer lines, and control means in this present invention is such that an efficient compact unitary apparatus is provided to carry out the improved operation. Briefly, the apparatus of this invention comprises in combination a lower confined contacting chamber, an upper confined contacting chamber disposed in vertical alignment with the lower chamber, fluid inlet means at the lower end of each of said chambers and fluid outlet means at the upper end of each of said chambers, a discharge well for solid particles extending downwardly from the lower end of each of said chambers, an open-ended vertical conduit extending upwardly from the lower portion of the lower discharge well through said lower chamber and said wells and through a substantial portion of said upper chamber to an elevated point therein, fluid inlet means extending through the lower portion of the lower discharge well to the lower or inlet end of the open-ended conduit, another conduit out of alignment with the open-ended conduit and connecting said upper discharge well with the upper portion of the lower contacting chamber.

Various modifications in construction may be made in the vertically aligned compact unit without departing from the scope of the invention. In a preferred embodiment, the upper contacting chamber is supported from the lower chamber and the conduit which runs vertically through the chambers is provided with an expansion joint such that differential linear expansions resulting from temperature differentials between the chambers and the open-ended conduit may be accommodated. Suitable means for separating solid particles (such as for example cyclone separators) may also be provided in the upper portion of each of the contacting chambers to prevent loss of finely divided contact material from the chambers by entrainment with fluid reaction products being discharged therefrom. Adjustable control means are preferably provided in the lower portion of the lower discharge well, at the entrance to the open-ended conduit, such that the quantity of solid particles entering the open-ended conduit may be regulated to in turn provide means for controlling and maintaining desired ratios of solid particles to fluid medium.

One of the particularly advantageous features of the improved operation consists in that two separate reactions may be carried out concurrently in a single reactor and regenerator unit. Thus, the cracking of relatively heavy hydrocarbon oil fractions and the reforming of lighter fractions, such as naphtha or gasoline fractions, may be effected simultaneously, and an improved high octane product obtained from the upper contacting chamber when using the latter as reactor and the lower contacting chamber as regenerator. The reforming stock charged to the lower end of the unit serves as fluid medium for transferring regenerated catalyst particles through the internal vertical conduit or riser to the reactor chamber. The vertical riser conduit provides a high temperature reforming zone for the hydrocarbon stock charged thereto, and this conduit in turn will be subjected to only a minimum of erosive wear, in contrast to conventional curved, off-set or external riser lines. Also, the operation of discharging catalyst from the top of the vertical riser to the top of the catalyst bed in the reactor permits substantially countercurrent contact between the hydrocarbon oil cracking stock charged to the lower portion of the catalyst bed in the reactor, and the catalyst particles descending within this reactor. Catalyst particles discharged from the vertical riser conduit are effectively stripped of volatilizable reforming products by the displacing action of the fluid with which these particles come into contact during their downward travel through the reactor bed.

While the method of simultaneously effecting cracking and reforming treatments as outlined above and described in greater detail hereinafter constitutes an important mode of applying the present invention, it is not to be inferred that the invention is intended to be limited thereto. The invention may be applied in an analogous manner to the simultaneous dehydrogenation treatment of two reactants requiring different temperatures for their optimum dehydrogenation. For example, a butane charge may be treated at a relatively low temperature and preferably for a more prolonged contact time with dehydrogenation catalyst for the production of butadiene by being supplied to the lower portion of the catalyst bed in the upper contacting chamber while an intermediate product fraction of the process largely consisting of or containing butylene is supplied to the inlet end of the vertical riser conduit to be subjected therein to dehydrogenation to butadiene at a higher temperature under the influence of freshly reactivated and therefore more active catalyst, preferably during a shorter contact time, said intermediate product fraction serving at the same time as fluid medium for transferring catalyst from the lower contacting chamber, used as regenerating zone, to the top of the bed in the upper contacting chamber.

Another group of concurrent conversion reactions to which the invention may be applied comprises the reforming treatment of naphtha fractions, particularly those rich in aliphatic and naphthenic components of at least six carbon atoms to the molecule with a dehydrogenation-dehydrocyclization type of catalyst to produce fractions rich in aromatic hydrocarbons, in the descending catalyst bed in the upper contacting chamber while insufficiently converted product fractions of the process, separated by fractionation or extraction or by a combination of these treatments, from the fluid conversion products discharged from the upper portion of the upper contacting chamber, are simultaneously subjected in the vertical riser conduit to a renewed aromatization treatment with more active catalyst and at a somewhat higher average temperature than the average temperature prevailing in the descending bed in the upper contacting chamber. Other modes of applying the invention to operations involving concurrent conversion of several different reactants and use of a catalyst for successively catalyzing the different conversion reactions will be apparent to those familiar with the art of catalysis.

It has been recognized that solid refractory catalysts which have been contaminated or more or less deactivated by carbonaceous deposits during their use in the performance of catalyzed organic reactions including, by way of example, the cracking, dehydrogenation, desulfurization, reforming, isomerization and related treatments of hydrocarbon oils, fractions thereof, hydrocarbon gas mixtures, individual hydrocarbons and related hydrocarbonaceous materials, require treatment in several successive stages maintained at different temperatures and utilizing the same or different kinds of regenerating fluids in order to secure reactivation under optimum conditions or to an optimum degree of activity. The process of the present invention is advantageously applicable to these types of regeneration treatments. A typical mode of operation of this type, applicable particularly in oil cracking operations, comprises a two-stage catalyst regeneration treatment in combination with a single-stage conversion reaction wherein fluid organic reactant is converted during its upward passage through the catalyst bed in the lower contacting chamber, contaminated catalyst is withdrawn from the latter into the vertical riser conduit and during its passage therethrough is subjected to the transporting and regenerating action of an oxidizing gas, the free oxygen content of which is controlled so that the gaseous component of the gas-solid mixture issuing from the upper or discharge end of the vertical riser conduit is substantially devoid of free oxygen, the partially regenerated particles discharged from the vertical riser conduit and passing in a generally downward direction through the bed in the upper contacting chamber are countercurrently treated with another stream of oxidizing gas of controlled excess free oxygen content such that the combustion gases resulting from this second stage regeneration are substantially devoid of carbon monoxide. An important advantage of this particular mode of operation resides in the ease of avoiding overheating of the catalyst at any stage of its regeneration.

Another typical mode of two-stage regeneration which may be practiced in accordance with the present invention comprises a single-stage conversion of an organic reactant in the lower contacting chamber in the presence of a catalyst, requiring for its reactivation successively an oxidizing and a reducing treatment, the oxidation treatment of contaminated catalyst entering the vertical riser conduit being effected with the aid of an oxidizing gas containing appropriately controlled amounts of free oxygen to effect the desired oxidation or combustion of carbonaceous contaminants, while the reduction treatment is effected during the downward passage of the catalyst particles through the bed in the upper contacting chamber countercurrently to a gas containing controlled amounts of the reducing agent, such as for example hydrogen, such that the desired reduction of the catalyst or of reducible components of a composite catalyst is obtained without any substantial excess of the reducing agent penetrating to above the bed in the upper contacting chamber. This mode of operation may be applied, for example, to the dehydrogenation of hydrocarbons in the presence of a catalyst comprising chromium sesquioxide.

Another advantageous feature of the present invention lies in the withdrawal of catalyst from either or each of the contacting chambers in an annular column around the internal vertically disposed catalyst riser conduit. The arrangement of such annular column provides an elongated zone, suitable for efficient stripping of catalyst particles by a countercurrently flowing stripping medium of steam, flue gas, or other suitable relatively inert gaseous medium. The location and construction of the annular stripping zone also provides for the transfer of heat to the downwardly flowing catalyst column by means of indirect heat exchange from the rising stream of hot catalyst within the riser conduit. It is well recognized that maintaining a relatively high temperature in a stripping zone provides for a more efficient stripping of adsorbed and occluded vaporous materials from the catalyst particles.

The accompanying drawing illustrates a diagrammatic elevational view of the contacting unit and the following description thereof will aid in showing the improved flow and apparatus arrangement as well as point out further advantageous features of this invention.

Referring now to the drawing, there is shown an upper contacting chamber 1, a lower contacting chamber 2 and a skirt or connecting section 3 which will serve to support the upper chamber on the lower. Each of the contacting chambers is adapted to maintain a downwardly moving or fluidized contact bed of finely divided catalytic material. The top of the bed in chamber 1 is indicated by the broken line 4 while the top of the contact bed in chamber 2 is indicated by the broken line 5. For the purpose of simplifying the following description, the apparatus will be described with reference to a hydrocarbon oil conversion operation utilizing the upper contacting chamber 1 and the catalyst bed therein as a reaction or conversion zone for cracking a hydrocarbon charge and the lower contacting chamber 2 and the catalyst bed therein as a regeneration zone, although it will be understood from the foregoing description that conversion and regeneration may, under certain conditions, be effected in the lower and upper contacting chamber, respectively. In the arrangement as illustrated and now to be described the hydrocarbon charge to be cracked is supplied to the chamber 1 or reactor by way of line 6 having control valve 7. This charge to the reactor may be a relatively heavy oil such as crude, topped crude or a gas oil, for in the operation of this invention, a relatively high carbon deposition may be permitted in the reaction zone. When a fluidized catalyst operation is desired, one or more distributing grids 8 may be provided across the reaction zone within the chamber 1 such that improved distribution between the upwardly flowing reactant stream and the downwardly flowing catalyst particles may be effected. Distributing grids above the one indicated in the drawing will however be omitted in chamber 1 or in chamber 2, or in both of these chambers when the bed in one or each of these chambers is to be employed as a relatively compact downwardly moving bed. Reaction products from the upper portion of the contacting chamber 1, pass through a separator 9 and are discharged by way of line 10 while catalyst particles removed from the outgoing stream are returned to the contact bed by means of a return line or dip leg 11.

The contaminated contacted catalyst particles are withdrawn from the lower end of the upper chamber 1 by means of an elongated discharge well 12 which in turn feeds the withdrawn particles into a conduit 13, having control valve 14, such that the particles may be discharged to the top of the contact bed within the lower chamber 2, wherein oxidation of the contaminating material on the contacting particles is carried out and reactivation or regeneration thereby effected. A regenerating gas, which may be air or other oxygen containing stream, is charged to the lower end of the regeneration chamber by means of line 15 having control valve 16. The regenerating gas passes upwardly through distribution grid 17 (or a plurality of such grids, spaced vertically apart from each other in the catalyst bed in a preferable mode of fluidized catalyst operation) and flows countercurrently to the descending particles to effect the burning and removal of the carbonaceous materials on the catalyst particles. The combustion gases with entrained catalyst particles enter the separator 18, in the upper portion of chamber 2, and are passed therefrom substantially free of solid particles to suitable heat recovering apparatus prior to being discharged to the atmosphere. The combustion gas, or flue gases, are removed from separator 18 and the contact chamber 2 by means of flue line 19, having control valve 20, while separated catalyst particles are returned to the contact bed in the regenerator by means of dip leg 21.

The transfer of regenerated catalyst particles is effected by means of the discharge well 22 at the lower end of the regeneration chamber 2. The particles flow downwardly in an annular column, between a central riser conduit 23 and the inner wall of the well 22, to the lower end of the latter wherein they reverse their direction of flow and pass upwardly through the riser conduit 23. A fluid medium is charged to the lower portion of the discharge well 22 and to the entrance of conduit 23 by means of line 24, such that the withdrawn catalyst particles are aerated and carried upwardly, essentially in the form of a suspension of said particles in the fluid medium, through line 23 to the top of the reactor chamber 1.

In a preferable operation of the present invention, a charge stock for reforming is passed through line 24 having control valve 25, to the lower end of the open-ended and central riser conduit 23. The reforming stock may be a relatively more refractory material than the cracking stock, such as a light gas oil, or a naphtha product, which in turn, may be supplied from an external source or which may be a fraction separated from the conversion products withdrawn from the upper reaction zone 1. The hot regenerated catalyst as it is withdrawn from the lower end of chamber 2 is of sufficient temperature to provide suitable reforming of the charge stock supplied to conduit 23 and the length of the riser conduit 23 is such as to provide a substantial contact time for carrying out a reforming operation. By discharging the regenerated catalyst and the reformed hydrocarbon products to the upper portion of the reactor chamber 1, the reformed material may be commingled with the products of catalytic cracking therein, prior to being discharged therefrom through separator 9 and outlet line 10. Line 10 will carry the products to suitable fractionating equipment while separated and collected catalyst particles are discharged to the upper portion of the contact bed 4, within the reaction zone, such that a countercurrent contact will result between the cracking stock and the catalyst particles. An adjustable sleeve 26 or other valving arrangement is provided at the lower end of the open-ended conduit 23 to control the flow of catalyst particles from the withdrawal well 22 into this transfer conduit, thereby providing means for controlling the quantity of catalyst to be carried with the reforming stock to the reactor. The open ended conduit 23, in a preferable embodiment of the apparatus, is a straight conduit passing vertically through the entire length of the lower contact chamber and through substantially the entire height of the catalyst bed within the upper contacting chamber along the central vertical axis of these chambers. A straight vertical conduit free from bends and internal obstructions assures an easier and more efficient fluidized transfer of catalyst particles from the lower contacting chamber to the upper, with a minimum amount of erosion being effected in such conduit. A suitable expansion joint 27 is placed in the conduit 23 between the upper contacting chamber 1 and the lower chamber 2 such that differential expansions, due to temperature, may be accommodated between the independent chambers and the connecting conduit 23. An expansion joint, not shown in the drawing, may also be provided for a similar purpose in line 13, if so desired.

The upper discharge well 12 in being positioned around the central riser conduit 23 provides a very efficient stripping zone for the contacted catalyst particles which are being withdrawn in an annular column from the contact zone of the upper chamber 1. The hot catalyst rising through line 23 will dissipate some of its heat to the downwardly moving column of catalyst particles in the discharge well 12 and thus provide a somewhat higher temperature therein than might be realized in a differently located and positioned stripping zone. As hereinbefore noted, a high temperature stripping operation provides a more efficient removal of occluded vaporous products from the catalyst particles. A stripping medium is charged to the stripping zone within the well 12, by way of line 28, having control valve 29. The stripping medium may be steam, nitrogen, flue gas or other suitable relatively inert gaseous medium. The annular zone between riser conduit 23 and the wall of discharge well 12 may be provided with a plurality of grids or screens 30 to assure a more efficient distribution and uniform contact between the countercurrently flowing catalyst particles and stripping medium. A stripping medium may also be charged to the lower withdrawal zone or discharge well 22 by means of line 35, having valve 36, and the discharge well 22 may, if so desired, be provided with a plurality of grids or screens as described for discharge well 12.

An auxiliary line 31, having valve 32, is provided between the upper portion of chamber 1 and the lower hydrocarbon charge line 24, such that a portion of the vaporous reaction products may be recycled through the central conduit 23 and reforming zone of the unit. To insure efficient circulation in the recycle operation, a blower 33 is placed in the recycle circuit, such blower taking suction from line 31 and discharging through line 34 to line 24.

The recycle circuit permits various alternate operations of the conversion unit. For instance, in starting up the unit, the process vapors may be recirculated until such time as the temperature distribution and conversion conditions are such that reforming stock may be used to transfer the regenerated catalyst from the lower end of the unit to the upper reaction chamber. It may also be desirable in certain operations, to continuously pass a portion of the product stream through the recycle circuit to mix with the charge stock entering line 24, in order to apply a retreating operation, or further reforming to a portion of the product stream.

The above description has been directed to the cracking and reforming of hydrocarbon charge stocks; however, it is not intended to limit the improved flow to these operations only, for dehydrogenation, aromatization, desulfurization, or other conversion processes which may be carried out by contact with small subdivided particles of solid contact material or catalyst may be effected within a unit of this type. The catalyst may comprise any of the well known natural or synthetic powdered or manufactured spherical materials, or of course, a mixture of catalysts may be used, such as a mixture of cracking and reforming catalysts. Also, it is not intended to limit the construction of the compact unitary apparatus to the exact proportions or mechanical and structural features that are shown in the accompanying drawing, for obviously, the proportions of the essential structural parts, the positioning and type of accessory parts, the number of distribution grids, the types of valves, and the like, may be varied somewhat to suit the particular purposes of use, without departing from the scope of this invention.

I claim as my invention:

1. A method for the simultaneous conversion of two different hydrocarbon streams which comprises maintaining a downwardly moving bed of subdivided solid catalyst particles in each of two contacting zones disposed in vertical alignment, passing one of said hydrocarbon streams at conversion temperature through the catalyst bed in the upper of said zones, continuously discharging contacted solid catalyst particles from the upper of said zones to the top of the bed in the lower zone, passing an oxidizing gas upwardly through the bed in the lower of said zones, withdrawing oxidized and regenerated catalyst particles downwardly from the lower portion of said lower zone, commingling the regenerated catalyst particles withdrawn from the lower zone with the other of said hydrocarbon streams, passing the resultant mixture upwardly in a confined straight line path through the catalyst beds in said contacting zones and then discharging the same into the upper portion of said upper zone, and subjecting said other hydrocarbon stream to conversion during its upward passage in said confined path.

2. A method for contacting subdivided solid particles with three fluid streams which comprises maintaining spaced beds of subdivided solid catalyst particles in an upper reaction zone and a lower regeneration zone disposed in vertical alignment, passing a regenerating gas as one of said fluid streams upwardly through the bed in the lower regenerating zone at a sufficient velocity to maintain said bed in a turbulent fluidized state therein, removing resultant regeneration gases from the space between said beds and preventing their introduction to the bed in the reaction zone, withdrawing regenerated solid catalyst particles downwardly in an annular column from the lower portion of said regenerating zone, commingling the thus withdrawn regenerated particles with a vertically upwardly flowing hydrocarbon vapor stream as the second of said fluid streams, passing the resulting mixture of particles and hydrocarbon vapor in a confined straight line path through said annular column and the lower regenerating zone and through substantially the height of the bed in the upper reaction zone and discharging the same to the top of the catalyst bed in said reaction zone, passing a second hydrocarbon stream as the third of said fluid streams upwardly through the catalyst bed in said reaction zone at a sufficient velocity to maintain the bed in turbulent fluidized condition therein, withdrawing contaminated solid catalyst particles downwardly from the lower portion of said reaction zone in an annular column of smaller cross-sectional area than the bed in the reaction zone and passing said annular column of catalyst particles in indirect heat exchange relationship with said confined path of said upwardly flowing mixture, and discharging said contaminated catalyst particles from the downwardly moving annular column to the top of the catalyst bed in said regenerating zone.

3. A method for contacting subdivided solid particles with three fluid streams which comprises maintaining spaced beds of subdivided solid catalyst particles in an upper reaction zone and a lower regeneration zone disposed in vertical alignment, passing a regenerating gas as one of said fluid streams through the bed in the lower regenerating zone, removing resultant regeneration gases from the space between said beds and preventing their introduction to the bed in the reaction zone, withdrawing regenerated solid catalyst particles downwardly in an annular column from the lower portion of said regenerating zone, commingling the regenerated particles thus withdrawn with a vertically upwardly flowing hydrocarbon vapor stream as the second of said fluid streams, passing the resulting mixture of catalyst particles and hydrocarbon vapor in a confined straight line path through said annular column and the lower regenerating zone and through substantially the height of the bed in the upper reaction zone and discharging the same to the top of the catalyst bed in said reaction zone, passing a second hydrocarbon stream, as the third of said fluid streams upwardly through the catalyst bed in said reaction zone, withdrawing contaminated solid catalyst particles downwardly from the lower portion of said reaction zone in an annular column of smaller cross-sectional area than the bed in the reaction zone and passing said annular column of contaminated catalyst particles in indirect heat exchange relationship with said confined path of said upwardly flowing mixture, discharging said contaminated catalyst particles from the downwardly moving annular column to the top of the catalyst bed in said regenerating zone, passing a fluid medium upwardly through each of said downwardly flowing annular columns of catalyst particles and stripping occluded vaporous and gaseous products from the particles therein.

4. A method for catalytic conversion of hydrocarbons which comprises maintaining a downwardly moving bed of subdivided solid catalyst particles in each of two contacting zones disposed in vertical alignment, passing the hydrocarbons at conversion temperature through the catalyst bed in the upper of said zones, continuously discharging solid particles from the upper of said zones to the top of the bed in said lower zone, passing a regenerating gas upwardly through the bed in the lower of said zones, withdrawing solid particles downwardly in an annular column from the lower portion of said lower zone, commingling the particles thus withdrawn from the lower zone with a vertically upwardly flowing fluid stream comprising a portion of the hydrocarbon reaction product from said upper contact zone, passing the resultant mixture of withdrawn particles and reaction product stream upwardly in a confined straight line path through said annular column and the lower contacting zone and through substantially the height of the bed in the upper contacting zone and discharging the same to the top of the bed in said upper zone.

5. A method for contacting subdivided solid particles with three fluid streams which comprises maintaining a downwardly moving bed of said subdivided solid particles in each of an upper reaction zone and a lower regeneration zone disposed in vertical alignment, passing an oxygen-containing regenerating gas as one of said fluid streams through the bed in the lower regenerating zone, withdrawing regenerated solid catalyst particles downwardly in an annular column from the lower portion of said regeneration zone, commingling regenerated particles thus withdrawn with a vertical upwardly flowing second fluid stream, commingling a portion of the reaction product withdrawn from the upper portion of said reaction zone with a hydrocarbon stream boiling substantially within the naphtha range and supplying the fluid mixture thus obtained as said second fluid stream, to the regenerated catalyst particles issuing from said annular column, passing the resultant mixture of second fluid stream and catalyst from the lower end of said annular column upwardly in a confined straight line vertical path through said annular column and said lower regenerating zone and through substantially the height of the bed in the upper reaction zone, discharging the mixture from said straight line path to the top of the catalyst bed in said reaction zone, passing a heavier and less refractory hydrocarbon stream as the third of said fluid streams upwardly through the catalyst bed in said reaction zone, withdrawing contaminated solid catalyst particles downwardly in an annular column from the lower portion of said reaction zone and conducting the annular column of said contaminated catalyst particles in indirect heat exchange relationship with said confined path of said upwardly flowing mixture, discharging said contaminated catalyst particles from said downwardly moving annular column to the top of the catalyst bed in said regenerating zone, passing a substantially inert fluid medium upwardly through each of said downwardly flowing annular columns of catalyst particles and stripping occluded vaporous and gaseous products from the particles therein.

6. A unitary apparatus comprising in combination a lower confined contacting chamber, an upper confined contacting chamber disposed in vertical alignment with said lower chamber, fluid inlet means at the lower end of each of said chambers and fluid outlet means at the upper end of each of said chambers, a discharge well for solid particles extending downwardly from the lower end of each of said chambers, an open-ended vertical conduit extending from the lower portion of the lower discharge well through the lower chamber and said wells and through a substantial portion of said upper chamber to an elevated point therein, fluid inlet means extending through the lower portion of said lower discharge well to the lower end of said open-ended conduit, another conduit out of alignment with said open-ended conduit and connecting said upper discharge well with the upper portion of said lower chamber.

7. A unitary apparatus comprising in combination a lower confined contacting chamber, an upper confined contacting chamber disposed in vertical alignment with said lower chamber, fluid inlet means at the lower end of each of said chambers and fluid outlet means at the upper end of each of said chambers, a discharge well for solid particles extending downwardly from the lower end of each of said chambers, an open-ended vertical conduit extending from the lower portion of the lower discharge well upwardly through the lower chamber and said wells and through a substantial portion of said upper chamber to an elevated point therein, fluid inlet means extending through the lower portion of said lower discharge well to the lower end of said open-ended conduit, another conduit out of alignment with said open-ended conduit and connecting said upper discharge well with the upper portion of said lower chamber, a recycle conduit connecting the upper part of said upper chamber with said fluid inlet to said open-ended conduit and fluid circulating means disposed in said recycle conduit.

8. The apparatus of claim 6 further characterized in that said discharge wells encompass said open-ended conduit providing thereby an annular shaped withdrawal zone at the lower end of each of said chambers.

9. A hydrocarbon conversion process which comprises maintaining a downwardly moving bed of subdivided solid catalyst particles in an upper reaction zone and a lower regenerating zone disposed in vertical alignment, passing hydrocarbons heavier than gasoline through the catalyst bed in the reaction zone and subjecting the same to cracking conditions therein, discharging contaminated catalyst particles from the reaction zone to the regenerating zone, passing an oxygen-containing gas through the catalyst bed in the regenerating zone and therein burning carbonaceous contaminants from the catalyst, removing regenerated catalyst particles from the regenerating zone and suspending the same in a hydrocarbon stream containing gasoline fractions, passing the resultant suspension upwardly in a confined straight line path extending through said catalyst beds and subjecting the hydrocarbon stream to reforming during its passage in said confined path, discharging the suspension from said confined path into the reaction zone above the catalyst bed therein, and removing hydrocarbon conversion products from the reaction zone.

10. The process as defined in claim 9 further characterized in that said hydrocarbon stream comprises a portion of the conversion products removed from the reaction zone.

FREDERICK W. LEFFER.

REFERENCES CITED

The following references are of record in the file of this patent:

UNITED STATES PATENTS

| Number | Name | Date |
|---|---|---|
| 2,385,446 | Jewell et al. | Sept. 25, 1945 |
| 2,389,399 | Alther | Nov. 20, 1945 |
| 2,391,434 | McAfee | Dec. 25, 1945 |
| 2,408,600 | Berg | Oct. 1, 1946 |
| 2,412,152 | Huff | Dec. 3, 1946 |